US012662309B2

(12) United States Patent　(10) Patent No.: US 12,662,309 B2
Kao et al.　(45) Date of Patent: Jun. 23, 2026

(54) STORAGE DEVICE

(71) Applicant: Wistron Corporation, New Taipei City (TW)

(72) Inventors: Ssu-Chieh Kao, New Taipei City (TW); Jian-Rong Liao, New Taipei City (TW); Wei-Jen Liu, New Taipei City (TW); Chi-Jung Chen, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 455 days.

(21) Appl. No.: 18/452,077

(22) Filed: Aug. 18, 2023

(65) Prior Publication Data

US 2024/0383677 A1　Nov. 21, 2024

(30) Foreign Application Priority Data

May 18, 2023　(TW) ................................. 112118598

(51) Int. Cl.
*B65G 1/02*　(2006.01)
*G05D 3/10*　(2006.01)
(52) U.S. Cl.
CPC ............... *B65G 1/026* (2013.01); *G05D 3/10* (2013.01)
(58) Field of Classification Search
None
See application file for complete search history.

(56) References Cited

U.S. PATENT DOCUMENTS

| | | | |
|---|---|---|---|
| 5,605,429 A | 2/1997 | Hejazi et al. | |
| 5,950,846 A * | 9/1999 | Duane .................. | A47B 96/025 |
| | | | 211/175 |

(Continued)

FOREIGN PATENT DOCUMENTS

| | | | | |
|---|---|---|---|---|
| CN | 110786644 A * | 2/2020 | ............. | E04H 6/422 |
| CN | 111278752 B * | 12/2021 | ............. | B65G 35/00 |

(Continued)

OTHER PUBLICATIONS

CN 110786644 A—Translation (Year: 2020).*
Examination report dated Sep. 27, 2023, listed in related Taiwan patent application No. 112118598.

*Primary Examiner* — Jacob S. Scott
(74) *Attorney, Agent, or Firm* — McClure, Qualey & Rodack, LLP

(57)　ABSTRACT

A storage device includes a storage cabin, a carrier assembly, a transmission assembly, a door assembly, and a controller set. The storage cabin has a receiving portion and an opening portion. The carrier assembly is located in the receiving portion, and includes a plurality of carrier plates. The transmission assembly is connected to the carrier assembly, and selectively moves the carrier plates. The door assembly is adjacent to the opening portion, and selectively covers the opening portion. The controller set is configured to drive the transmission assembly to make the carrier plates divide the receiving portion and the opening portion into a storage space and an access opening respectively according to an item height, and drive the door assembly to cover a portion of the opening portion other than the access opening. A height of the storage space corresponds to the item height.

14 Claims, 10 Drawing Sheets

(56) References Cited

U.S. PATENT DOCUMENTS

| | | | | | |
|---|---|---|---|---|---|
| 8,733,860 | B1 * | 5/2014 | Burke | ........................ | A47F 1/00 |
| | | | | | 312/134 |
| 9,790,028 | B2 * | 10/2017 | Stiernagle | ............. | B65G 1/0457 |
| 10,019,610 | B2 * | 7/2018 | Jun | ..................... | G06K 7/10376 |
| 11,136,189 | B2 * | 10/2021 | Cohen | .................... | B65G 1/065 |
| 2020/0156868 | A1 * | 5/2020 | Bidram | ................ | B65G 1/0492 |

FOREIGN PATENT DOCUMENTS

| | | | | | | |
|---|---|---|---|---|---|---|
| CN | 114537936 | A | * | 5/2022 | .............. | B65G 1/04 |
| CN | 217243279 | U | * | 8/2022 | | |
| DE | 102019003946 | A1 | * | 12/2020 | ........... | A47G 29/141 |
| EP | 3566900 | A1 | * | 11/2019 | ........... | B60P 1/4471 |
| EP | 4053048 | A1 | * | 9/2022 | ........... | B65G 1/1378 |
| ES | 2869574 | T3 | * | 10/2021 | ........... | E05D 15/264 |
| GB | 2608653 | A | * | 1/2023 | .............. | E05F 1/16 |
| KR | 20160076149 | A | * | 6/2016 | .............. | B65G 1/10 |
| KR | 102468221 | B1 | * | 11/2022 | ......... | G07C 9/00944 |
| NO | 20210960 | A1 | * | 2/2023 | ........... | B65G 1/1371 |
| WO | WO-2013176621 | A1 | * | 11/2013 | ............. | G07F 17/12 |
| WO | WO-2018069211 | A1 | * | 4/2018 | ............. | E06B 9/115 |
| WO | WO-2021252385 | A1 | * | 12/2021 | ............. | B64F 1/362 |
| WO | WO-2022009167 | A1 | * | 1/2022 | .............. | B65G 1/10 |

* cited by examiner

10

A-A

10

A-A

STORAGE DEVICE

CROSS-REFERENCE TO RELATED APPLICATION

This non-provisional application claims priority under 35 U.S.C. § 119(a) to patent application No. 112118598 filed in Taiwan, R.O.C. on May 18, 2023, the entire contents of which are hereby incorporated by reference.

BACKGROUND

Technical Field

The present application relates to a storage device, and in particular to a storage device applied to the field of warehousing.

Related Art

As the automatic control technology develops, the automatic control technology has been applied extensively to the field of warehousing. A warehousing system uses the automatic control technology only to carry items, and item access equipment of the warehousing system is not improved. For example, when an existing warehousing system is initially planned, a storage space of the warehousing system is required to be set. As a good planning manner, a warehouse is divided into a plurality of storage spaces of different sizes, to adapt to items of different sizes. However, because sizes of to-be-stored items are different, after the to-be-stored items are placed in corresponding storage spaces, there is still plenty of room left in each storage space. On the whole, not all the spaces in the warehouse can be fully used in this planning manner.

SUMMARY

In view of this, some embodiments provide a storage device. The storage device includes a storage cabin, a carrier assembly, a transmission assembly, a door assembly, and a controller set. The storage cabin has a receiving portion and an opening portion. The carrier assembly is located in the receiving portion, and includes a plurality of carrier plates. The transmission assembly is connected to the carrier assembly, and selectively moves the carrier plates. The door assembly is adjacent to the opening portion, and selectively covers the opening portion. The controller set is configured to drive the transmission assembly to make the carrier plates divide the receiving portion and the opening portion into a storage space and an access opening respectively according to an item height, and drive the door assembly to cover a portion of the opening portion other than the access opening. A height of the storage space corresponds to the item height.

In some embodiments, the door assembly includes a first door panel, a second door panel, and an actuator. When the door assembly is driven, the actuator actuates the first door panel and the second door panel, such that the first door panel and the second door panel separately cover the portion of the opening portion other than the access opening.

In some embodiments, the storage cabin includes a top plate and a bottom plate. The receiving portion and the opening portion are located between the top plate and the bottom plate. The receiving portion defines a remaining space according to the storage space.

In some embodiments, the controller set selectively drives the transmission assembly according to the item height, the height of the storage space, and a height of the remaining space, to adjust the height of the storage space.

In some embodiments, the carrier plates include a first carrier plate, a second carrier plate, and a third carrier plate. The first carrier plate is adjacent to the bottom plate. The third carrier plate is adjacent to the top plate. The second carrier plate is located between the first carrier plate and the third carrier plate. The transmission assembly moves the carrier plates, such that a first storage space and a first access opening are formed through division by the first carrier plate and the second carrier plate, and a second storage space and a second access opening are formed through division by the second carrier plate and the third carrier plate.

In some embodiments, the storage device further includes a visual assembly. The visual assembly is connected to a fixed surface of each of the second carrier plate and the third carrier plate. The visual assembly is configured to obtain a remaining storage height. The controller set updates a height of the first storage space, a height of the second storage space, and the height of the remaining space according to the remaining storage height.

In some embodiments, the storage device further includes a sensor set. The sensor set is connected to a fixed surface of each of the second carrier plate and the third carrier plate. The sensor set is actuated to generate a sensing signal. The controller set updates a height of the first storage space, a height of the second storage space, and the height of the remaining space according to the sensing signal.

In some embodiments, the storage device further includes an operation assembly. The operation assembly is configured to obtain the item height and an identification code. The identification code corresponds to the first access opening and the second access opening. The controller set is configured to drive, according to the item height and the identification code, the door assembly to selectively cover a portion of the opening portion other than the first access opening or the second access opening.

In some embodiments, the storage device further includes a weight measurer. The weight measurer is connected to a carrying surface of each of the first carrier plate, the second carrier plate, and the third carrier plate. The weight measurer is actuated to obtain an item weight. The controller set selectively drives, according to the item weight, the door assembly to cover the opening portion.

In some embodiments, the storage device further includes a counter. The counter is coupled to the controller set, and is configured to generate a counting stopping signal. The controller set drives, according to the counting stopping signal, the door assembly to cover the opening portion.

Some embodiments provide a storage device. The storage device includes a storage cabin, a carrier assembly, a transmission assembly, a door assembly, and a controller set. The storage cabin has a receiving portion and an opening portion. The carrier assembly is located in the receiving portion, and includes a plurality of carrier plates. The transmission assembly is connected to the carrier assembly, and selectively moves the carrier plates. The door assembly is adjacent to the opening portion, and selectively covers the opening portion. The controller set is configured to drive the transmission assembly to make the carrier plates divide the receiving portion and the opening portion into a storage space and an access opening respectively according to an item height, and drive the door assembly to cover a portion of the opening portion other than the access opening. A height of the storage space corresponds to the item height. The access opening has an identification code. The controller set drives, according to the identification code, the door assembly to cover the portion of the opening portion other than the access opening corresponding to the identification code.

The following proposes various embodiments for detailed description. However, the embodiments are merely example for description and not intended to limit the scope of protection of the present application. In addition, some elements are omitted in the drawings in the embodiments to clearly present technical features of the present application. The same reference numerals in all the drawings are used to represent the same or similar elements.

DETAILED DESCRIPTION

Figure 1:
FIG. 1 is a three-dimensional diagram of a storage device according to some embodiments of the present application.
Figure 1:
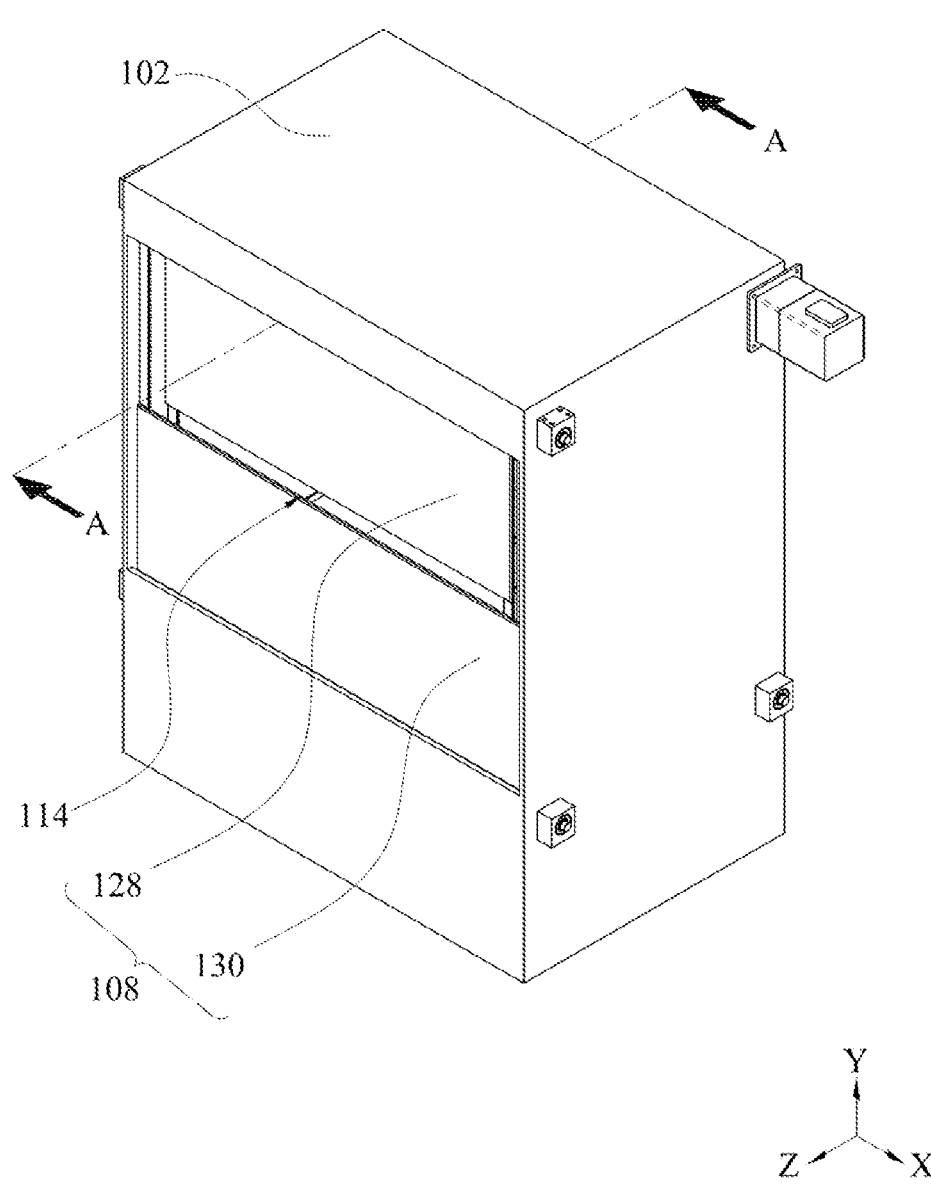
Figure 2:
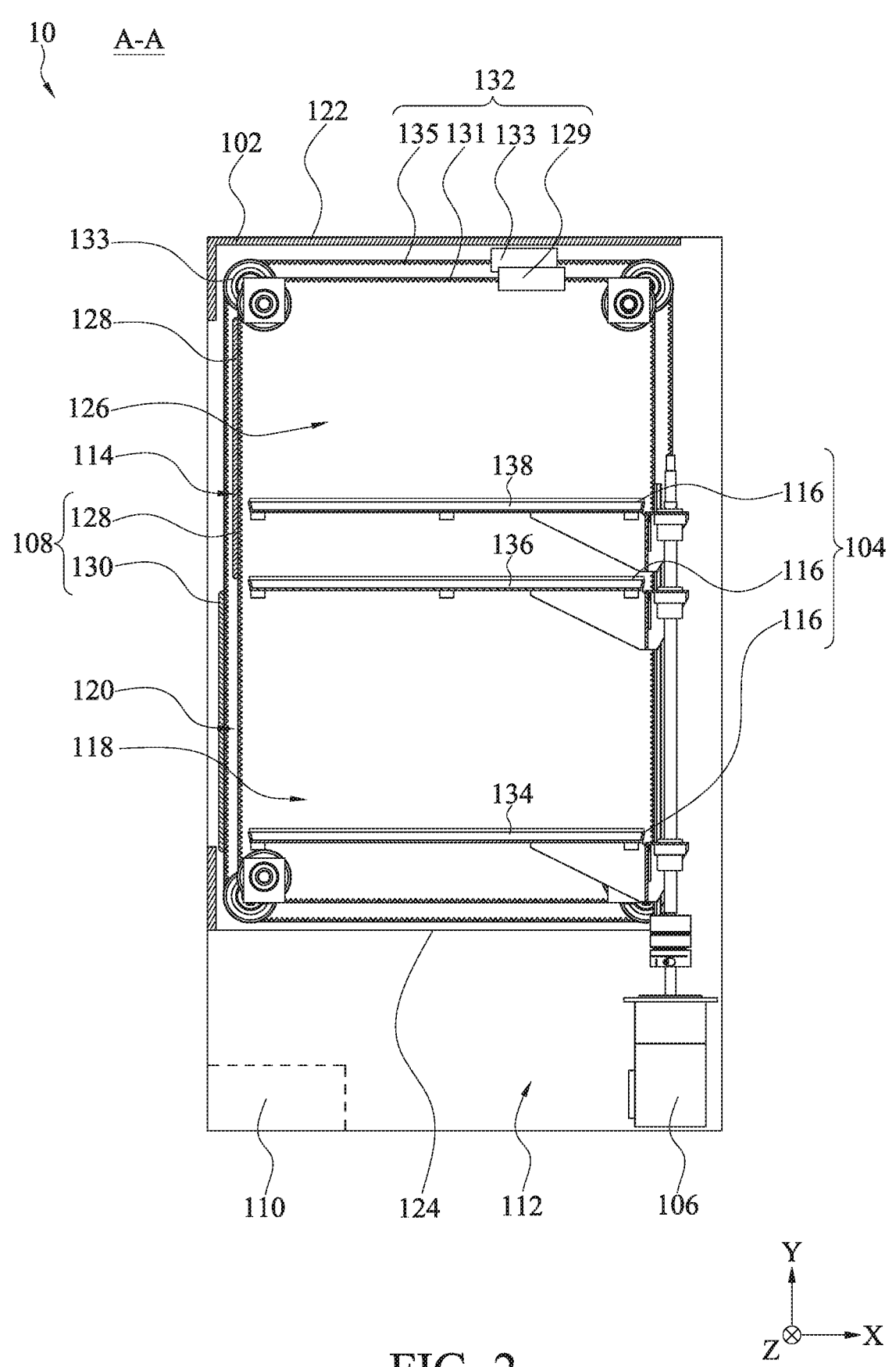
FIG. 2 is a sectional view of FIG. 1 in an A-A direction, which shows positions of a carrier assembly, a transmission assembly, and a door assembly at a storage cabin.
Figure 3:
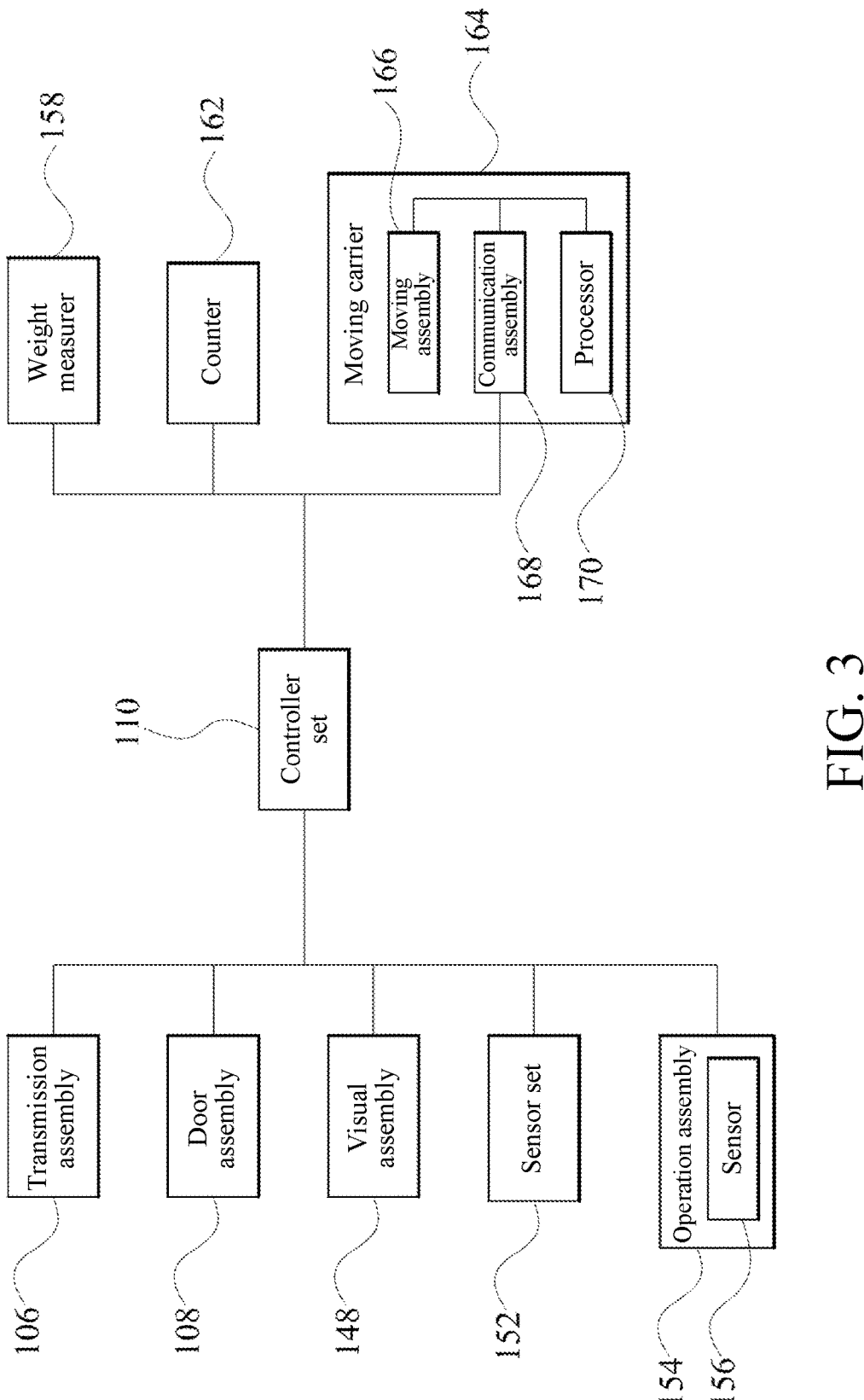
FIG. 3 is a circuit block diagram of a storage device according to some embodiments of the present application.

Refer to FIG. 1, FIG. 2, and FIG. 3. FIG. 1 is a three-dimensional diagram of a storage device according to some embodiments of the present application. FIG. 2 is a sectional view of FIG. 1 in an A-A direction, which shows positions of a carrier assembly, a transmission assembly, and a door assembly at a storage cabin. FIG. 3 is a circuit block diagram of a storage device according to some embodiments of the present application. As shown in FIG. 1 to FIG. 3, the storage device 10 includes a storage cabin 102, a carrier assembly 104, a transmission assembly 106, a door assembly 108, and a controller set 110. The storage cabin 102 has a receiving portion 112 and an opening portion 114. The carrier assembly 104 is located in the receiving portion 112, and includes a plurality of carrier plates 116. The transmission assembly 106 is connected to the carrier assembly 104, and selectively moves the carrier plates 116. The door assembly 108 is adjacent to the opening portion 114, and selectively covers the opening portion 114. The controller set 110 is configured to drive the transmission assembly 106 to make the carrier plates 116 divide the receiving portion 112 and the opening portion 114 into a storage space 118 and an access opening 120 respectively according to an item height, and drive the door assembly 108 to cover a portion of the opening portion 114 other than the access opening 120. A height of the storage space 118 corresponds to the item height.

The storage device 10 may be used by at least one user to access an item. In addition, when a user needs to access an item, the user may go to the storage device 10 to access the item, or the storage device 10 automatically moves to an access position for the user to access the item (which will be described later). In some embodiments, a plurality of storage devices 10 may be placed at specific places according to the number of users, to meet item access requirements of a plurality of users.

The storage cabin 102 may store an item. An internal space enclosed by the storage cabin 102 forms the receiving portion 112 (the receiving portion 112 may partially or completely occupy the internal space of the storage cabin 102), such that the carrier assembly 104, the transmission assembly 106, the door assembly 108, and the controller set 110 may be fixed to the storage cabin 102 and received in the receiving portion 112. In addition, the opening portion 114 of the storage cabin 102 is selectively communicated with the outside of the storage cabin 102. For example, when the door assembly 108 is opened, the opening portion 114 is communicated with the outside of the storage cabin 102. Specifically, the door assembly 108 may selectively cover the opening portion 114 to communicate the specific access opening 120 with the outside of the storage cabin 102, such that the user stores the item in the storage cabin 102 or retrieve an item from the storage cabin. When the door assembly 108 is closed, the opening portion 114 is isolated from the outside of the storage cabin 102, such that the receiving portion 112 forms a substantially closed space. Therefore, the item stored inside the storage cabin 102 is protected.

The carrier assembly 104 may be fixed to the storage cabin 102 and located in the receiving portion 112. The carrier plates 116 of the carrier assembly 104 may axially move to back and forth (for example, in a Y-axis direction in FIG. 2). Positions of the carrier plates 116 in the receiving portion 112 may divide the receiving portion 112 into at least one storage space 118. Specifically, the storage space 118 may be formed between two adjacent carrier plates 116, and a height between the two carrier plates 116 may be adjusted to adjust the storage space 118 to an appropriate height for a to-be-stored item. In some embodiments, carrier plates 116 that are yet not moved by the transmission assembly 106 may be stacked at a side opposite to the storage space 118. When the storage cabin 102 needs to be divided to form a new storage space 118, the carrier plate 116 adjacent to the storage space 118 may be moved towards the storage space 118 (for example, moved in a negative direction of a Y axis in the figure) and located with an appropriate height away from a height of a newly stored item, to form the new storage space 118 (which will be described later).

The transmission assembly 106 is connected to the carrier plates 116. In addition, the transmission assembly 106 may generate a linear movement (a movement in the Y-axis direction in FIG. 2) after driven by the controller set 110, such that the transmission assembly 106 may drive the carrier plates 116 to move and be stacked and separated within a range of the receiving portion 112. Moreover, the controller set 110 may control a movement range of the transmission assembly 106 according to the item height, such that the carrier plates 116 may be located at specified positions to form the storage space 118 for storing the item.

In some embodiments, the transmission assembly 106 may be a combination of a motor and a connecting rod, or may be a combination of a cylinder and a connecting rod.

The door assembly 108 may be disposed inside or outside the storage cabin 102. In addition, the door assembly 108 is driven by the controller set 110. After driven, the door assembly 108 may generate a door opening motion or a door closing motion. The door opening motion may mean that the door assembly 108 completely or partially covers the opening portion 114. The door closing motion may mean that the door assembly 108 completely or partially exposes the opening portion 114.

As shown in FIG. 3, the controller set 110 is coupled to the transmission assembly 106 and the door assembly 108. The controller set 110 may be located in the receiving portion 112, or may be located in another space of the storage cabin 102. After obtaining electronic information and performing an operation, the controller set 110 may selectively drive the transmission assembly 106 or the door assembly 108 (which will be described in detail later). In some embodiments, the controller set 110 may generate and store a corresponding identification code for an access opening 120 of each storage space 118. In addition, the controller set 110 further stores position data, an item height, and a height of the receiving portion 112, which correspond to each identification code, as well as a height of a remaining space 126 (which will be described later). Therefore, before obtaining the storage space 118 through division, the controller set 110 may calculate an appropriate height of the storage space 118 according to the item height and the height of the receiving portion 112. After the height of the storage space 118 is calculated, the height of the storage space 118 may be converted into a coordinate position of the receiving portion 112. According to the calculated coordinate position, the controller set 110 may drive the transmission assembly 106 to accurately move a specific carrier plate 116 to a specified position, or drive the door assembly 108 to cover an opening portion 114 at the corresponding position. The controller set 110 may be a human-computer interface apparatus, mainboard, or handheld computing apparatus (for example, a tablet computer or a smartphone) with an arithmetic capability, or may be a chip with an arithmetic capability, for example, a central processing unit (CPU), a single-chip microcomputer, a field programmable gate array (FPGA), a graphics processing unit (GPU), a microcontroller unit (MCU), or a microprogram controller.

As shown in FIG. 1 and FIG. 2, in some embodiments, the storage cabin 102 includes a top plate 122 and a bottom plate 124. The receiving portion 112 and the opening portion 114 are located between the top plate 122 and the bottom plate 124. The receiving portion 112 defines the remaining space 126 according to the storage space 118. It is to be noted that before the controller set 110 creates the storage space 118, the remaining space 126 is obtained by subtracting a space occupied by the transmission assembly 106 and the carrier assembly 104 from a space of the receiving portion 112 (for example, a space after the carrier plates 116 are stacked). After the storage space 118 is formed through division by the carrier plates 116, the controller set 110 may subtract the storage space 118 from the space of the receiving portion 112 to obtain the remaining space 126. In some embodiments, when the controller set 110 is intended to obtain a new storage space 118 through division, the controller set 110 may determine, according to the remaining space 126, whether there is enough space to form the new storage space 118. Specifically, when the new storage space 118 is larger than the remaining space 126 (for example, a height of the new storage space 118 is larger than that of the remaining space 126), the controller set 110 may not drive the transmission assembly 106, such that the carrier plates 116 may not divide the remaining space 126 to form the storage space 118. In some embodiments, when the new storage space 118 is larger than the remaining space 126, the controller set 110 may generate and issue alarm information, such that the user may determine, according to the alarm information, whether to continue or cancel item storage. The alarm information may be transmitted to a remote electronic apparatus (for example, a server) or a virtual cloud platform. For another example, when the new storage space 118 is less than or equal to the remaining space 126, the controller set 110 may divide the remaining space 126 to form another storage space 118 (that is, the new storage space 118).

Figure 4B:
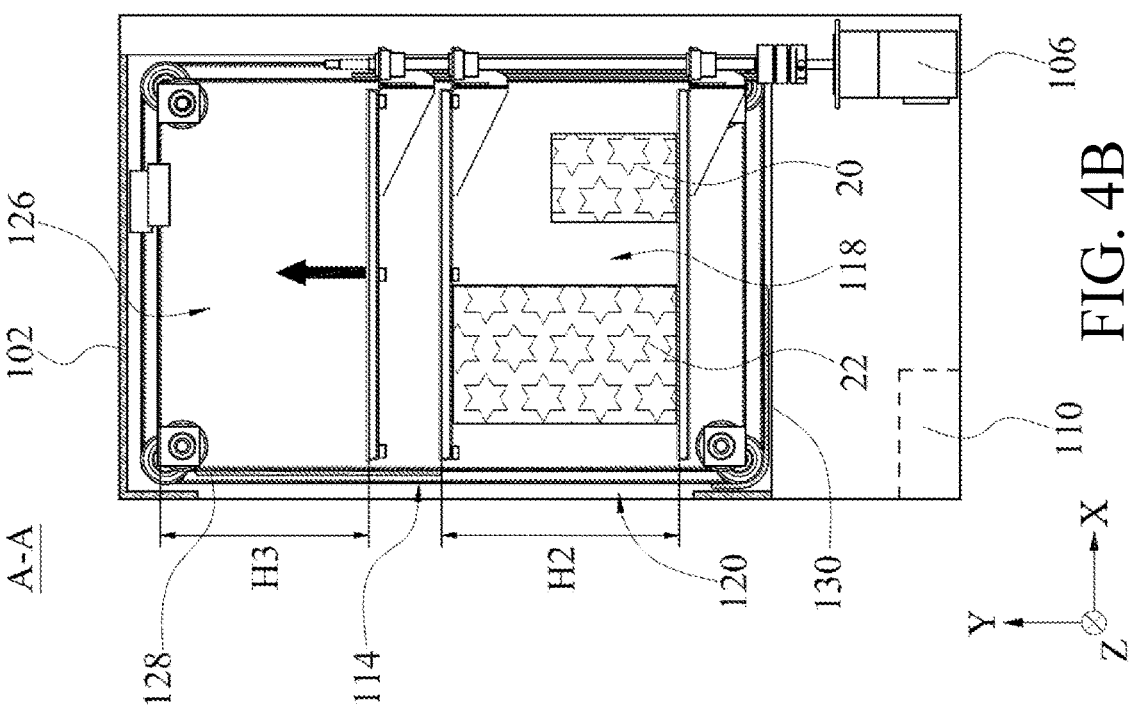
FIG. 4A and FIG. 4B are sectional views of FIG. 1 in an A-A direction, which show that a controller set drives a transmission assembly to adjust a height of a storage space.
Figure 4A:
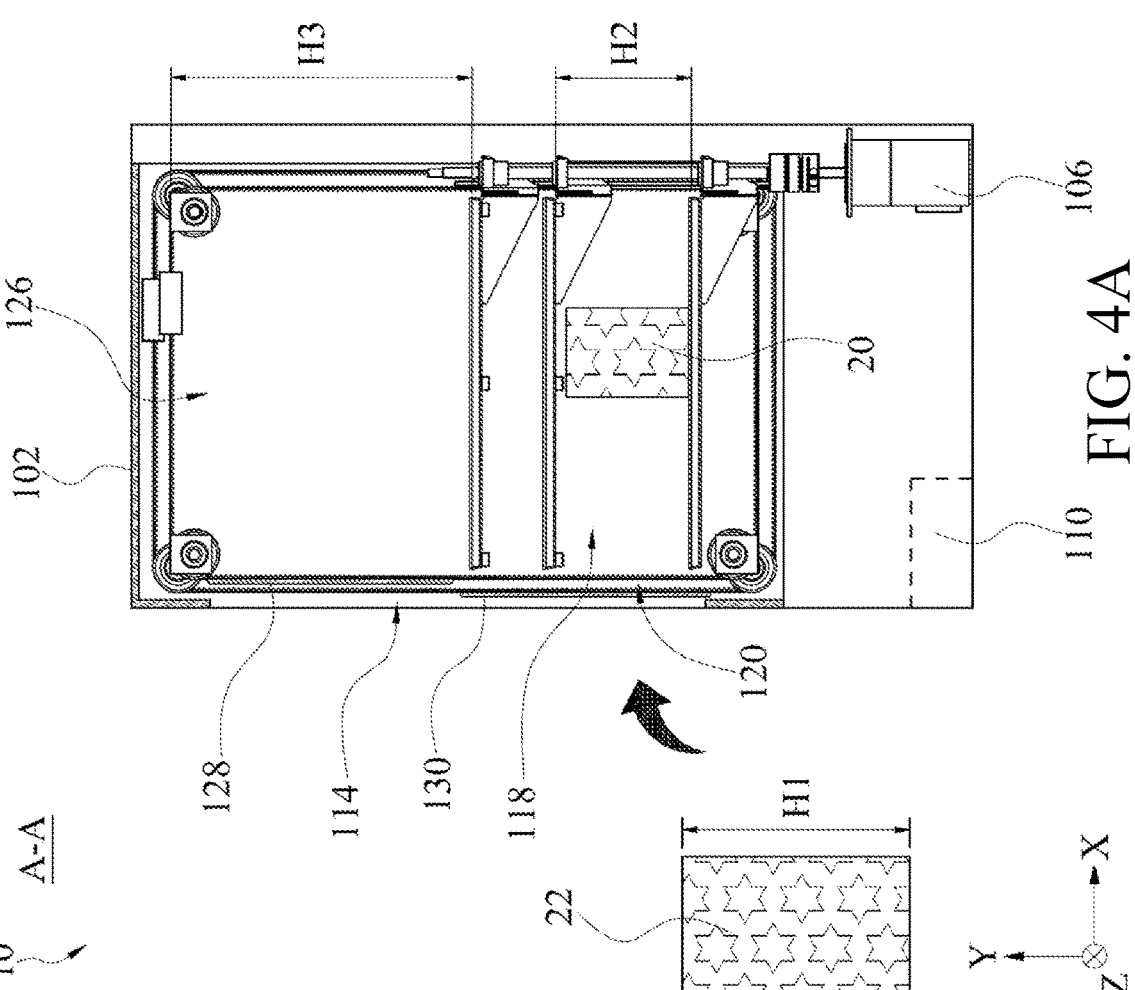

Refer to FIG. 4A and FIG. 4B. FIG. 4A and FIG. 4B are sectional views of FIG. 1 in an A-A direction, which show that a controller set drives a transmission assembly to adjust a height of a storage space. In some embodiments, the controller set 110 selectively drives the transmission assembly 106 according to an item height H1, a height H2 of the storage space 118, and a height H3 of the remaining space 126, to adjust the height H2 of the storage space 118. Specifically, when an item 20 is stored in the storage space 118, and a to-be-stored item 22 is to be stored in the storage space 118, the user may enter or scan the item height H1 of the to-be-stored item 22. The controller set 110 may compare the item height H1 with the height of the receiving portion 112 (that is, the height H2 of the storage space 118 and the height H3 of the remaining space 126 in FIG. 4A and FIG. 4B). When the item height H1 is less than the height H2 of the storage space 118, it indicates that there is enough space in the storage space 118 to store the to-be-stored item 22. In this case, the controller set 110 does not drive the transmission assembly 106, that is, the current height H2 of the storage space 118 is maintained. When the item height H1 is greater than the height H2 of the storage space 118, it indicates that there is not enough space in the storage space 118 to store the to-be-stored item 22. In this case, the controller set 110 determines, through comparison, whether the item height H1 is less than or equal to the height H2 of the storage space 118 plus the height H3 of the remaining space 126. If the foregoing condition is satisfied, the controller set 110 may adjust the height H2 of the storage space 118 according to the item height H1, such that the height H2 of the storage space 118 is substantially equal to the item height H1. There is enough space in the adjusted storage space 118 to store the to-be-stored item 22. On the contrary, if the foregoing condition is not satisfied, it indicates that the to-be-stored item 22 cannot be stored even if the storage space 118 is added with the remaining space 126. The controller set 110 may send an alarm signal to prompt the user whether to continue a storage operation. If the user selects to continue the storage operation, the controller set 110 drives the door assembly 108, such that door assembly 108 covers the portion of the opening portion 114 other than the access opening 120. The user may directly operate the controller set 110 (for example, press a button connected to the controller set 110), such that the controller set 110 drives the door assembly 108. In some embodiments, that "the height H2 of the storage space 118 is substantially equal to the item height H1" may mean that there is a margin for an adjusted height H2 of the storage space 118, that is, the adjusted height H2 of the storage space 118 may be greater than the item height H1 (close to the item height H1), such that the to-be-stored item 22 may more easily enter the access opening 120.

As shown in FIG. 2, in some embodiments, the door assembly 108 includes a first door panel 128, a second door panel 130, and an actuator 132. When the door assembly 108 is driven, the actuator 132 actuates the first door panel 128 and the second door panel 130, such that the first door panel 128 and the second door panel 130 separately cover the portion of the opening portion 114 other than the access opening 120. The door closing motion may mean that the first door panel 128 and the second door panel 130 move towards each other from two opposite sides of the opening portion 114, to partially or completely cover the opening portion 114. The door opening motion may mean that the first door panel 128 and the second door panel 130 move towards the two opposite sides of the opening portion 114, to partially or completely expose the opening portion 114. In some embodiments, the first door panel 128 and the second door panel 130 may be located on a same plumb line. Alternatively, the first door panel 128 is parallel to the second door panel 130.

In some embodiments, when the door assembly 108 covers the opening portion 114 completely, the first door panel 128 may directly or indirectly correspond to the second door panel 130. By taking direct correspondence as an example, the first door panel 128 and the second door panel 130 are located on the same plumb line. When the door assembly 108 performs the door closing motion, the first door panel 128 and the second door panel 130 may press against each other, such that the first door panel 128 and the second door panel 130 may completely cover the opening portion 114. By taking indirect correspondence as an example, the first door panel 128 and the second door panel 130 are staggered on a plumb line (not shown in the figure). When the door assembly 108 performs the door closing motion, the first door panel 128 and the second door panel 130 may partially overlap, or the first door panel 128 is adjacent to the second door panel 130 (without overlapping), such that the first door panel 128 and the second door panel 130 may substantially cover the opening portion 114.

In some embodiments, the first door panel 128 and the second door panel 130 are flexible, and may be rubber sheets or panels made from polyurethane. Alternatively, a plurality of folding structures (for example, folding lines) are formed on the first door panel 128 and the second door panel 130, and when the door assembly 108 performs the door closing motion, the first door panel 128 and the second door panel 130 may be separately folded together.

In some embodiments, the actuator 132 may include a first motor set 129, a first timing belt set 131, a second motor set 133, and a second timing belt set 135. The first motor set 129 is connected to the first timing belt set 131. The first timing belt set 131 is connected to the first door panel 128. When the door assembly 108 is driven, the first motor set 129 may move the first door panel 128 through the first timing belt set 131. In addition, the second motor set 133 is connected to the second timing belt set 135. The second timing belt set 135 is connected to the second door panel 130. When the door assembly 108 is driven, the second motor set 133 may move the second door panel 130 through the second timing belt set 135.

Figure 5:
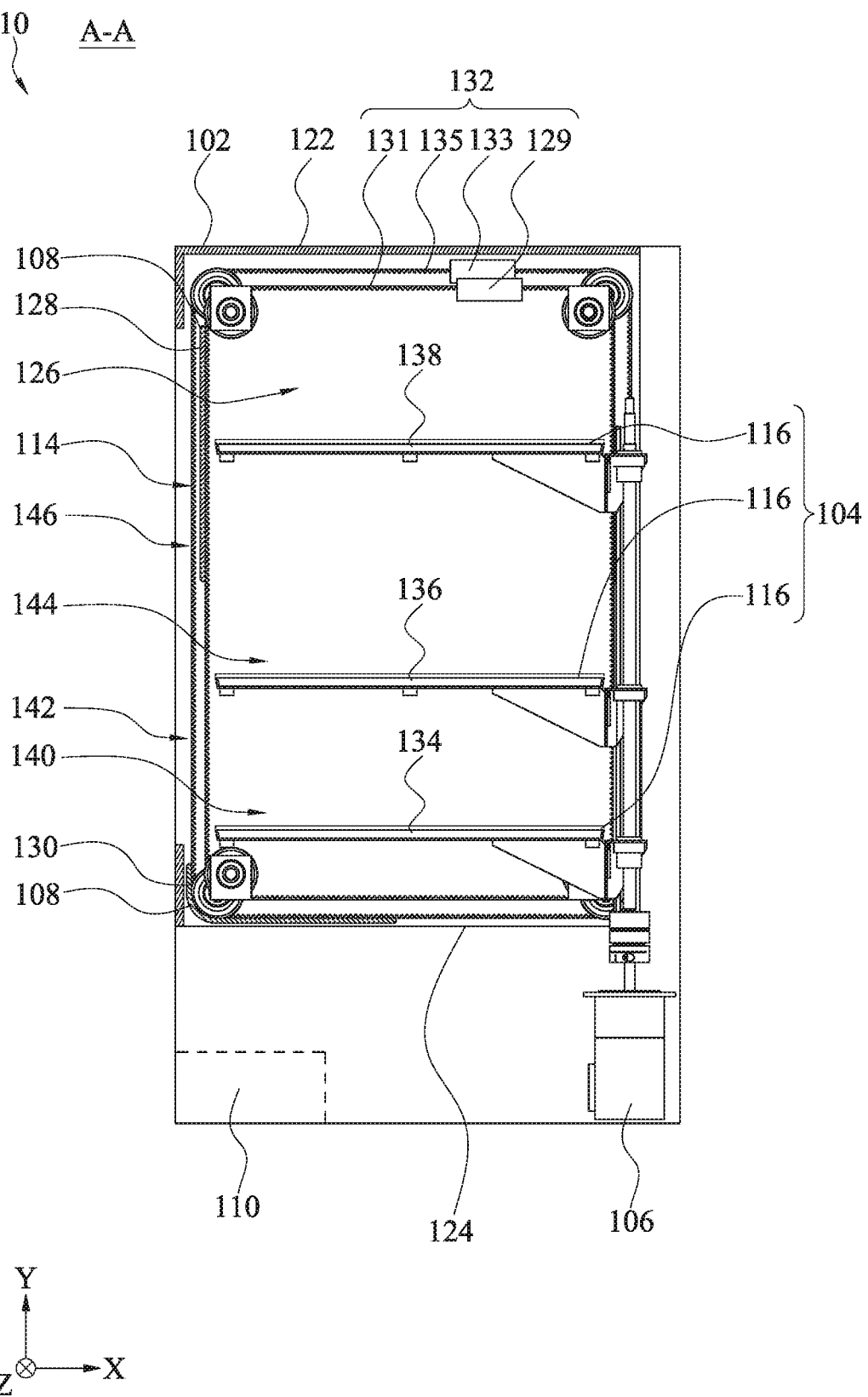
FIG. 5 is a sectional view of a storage cabin in an A-A direction according to some embodiments of the present application, which shows that a receiving portion is divided into a first storage space and a second storage space.
Figure 6:
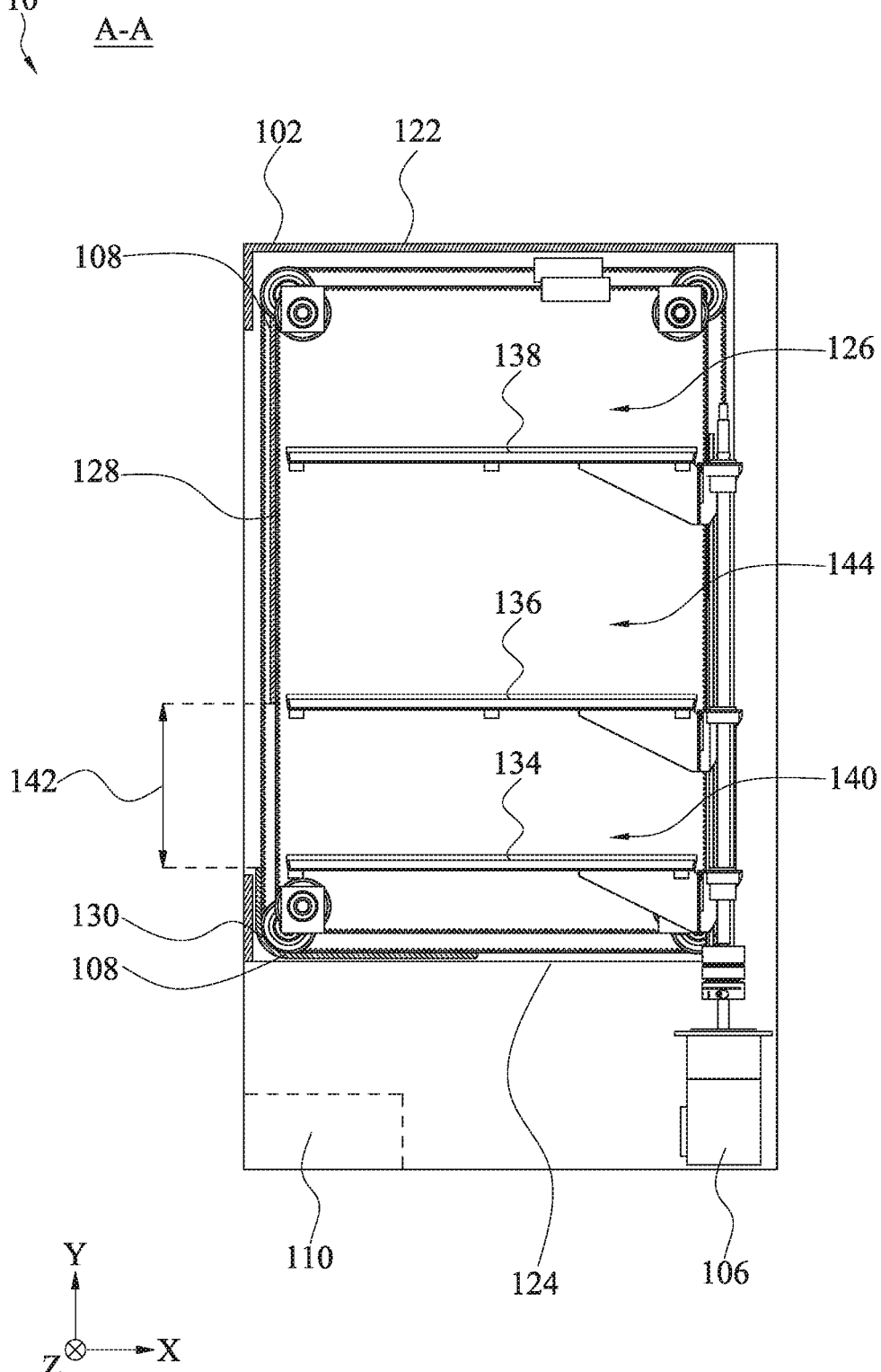
FIG. 6 is a schematic diagram of a first door panel and a second door panel corresponding to a first access opening according to FIG. 5.
Figure 7:
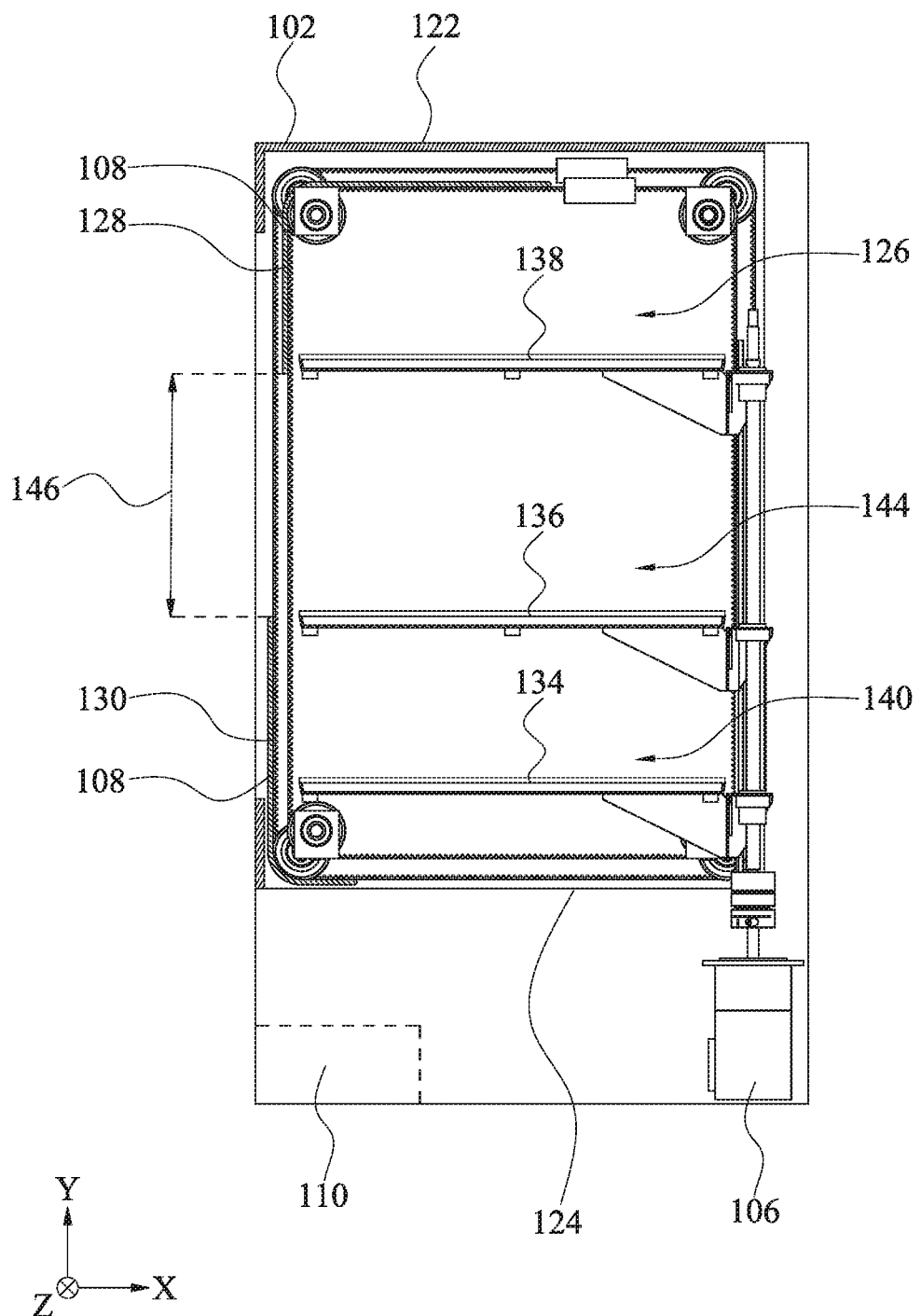
FIG. 7 is a schematic diagram of a first door panel and a second door panel corresponding to a second access opening according to FIG. 5.

Refer to FIG. 5, FIG. 6, and FIG. 7 together. FIG. 5 is a sectional view of a storage cabin in an A-A direction according to some embodiments of the present application, which shows that a receiving portion is divided into a first storage space and a second storage space. FIG. 6 is a schematic diagram of a first door panel and a second door panel corresponding to a first access opening according to FIG. 5. FIG. 7 is a schematic diagram of a first door panel and a second door panel corresponding to a second access opening according to FIG. 5. As shown in FIG. 5, in some embodiments, the carrier plates 116 include a first carrier plate 134, a second carrier plate 136, and a third carrier plate 138. The first carrier plate 134 is adjacent to the bottom plate 124. The third carrier plate 138 is adjacent to the top plate 122. The second carrier plate 136 is located between the first carrier plate 134 and the third carrier plate 138. The transmission assembly 106 moves the carrier plates 116, such that a first storage space 140 and a first access opening 142 are formed through division by the first carrier plate 134 and the second carrier plate 136, and a second storage space 144 and a second access opening 146 are formed through division by the second carrier plate 136 and the third carrier plate 138. Specifically, the controller set 110 may create the first storage space 140 and the second storage space 144 according to two different users, to drive the transmission assembly 106. For a creation process of the first storage space 140 and the second storage space 144, refer to the descriptions about the storage space 118. It is to be noted that after the receiving portion 112 is divided to form the first storage space 140 and the second storage space 144, the first access opening 142 and the second access opening 146 are formed at the opening portion 114 together. Before the controller set 110 obtains the first storage space 140 and the second storage space 144 through division, the controller set 110 may generate and store an identification code respectively. Each identification code may correspond to the first access opening 142 or the second access opening 146. The controller set 110 may drive the door assembly 108 according to the identification code, such that the first door panel 128 and the second door panel 130 may cover a portion of the opening portion 114 other than the first access opening 142 or the second access opening 146 (which will be described in detail later).

As shown in FIG. 6, the first access opening 142 is used as an example. When the controller set 110 obtains an identification code corresponding to the first access opening 142, the controller set 110 may obtain, according to the identification code, a coordinate position corresponding to the first access opening 142, and drive the door assembly 108. The first door panel 128 and the second door panel 130 respectively move to two ends of the first access opening 142. The first door panel 128 moves to a position adjacent to the second carrier plate 136. The second door panel 130 moves to a position adjacent to the first carrier plate 134.

As shown in FIG. 7, the second access opening 146 is used as an example. When the controller set 110 obtains an identification code corresponding to the second access opening 146, the controller set 110 may obtain, according to the identification code, a coordinate position corresponding to the second access opening 146, and drive the door assembly 108. The first door panel 128 and the second door panel 130 respectively move to two ends of the second access opening 146. The first door panel 128 moves to a position adjacent to the third carrier plate 138. The second door panel 130 moves to a position adjacent to the second carrier plate 136.

Figure 8:
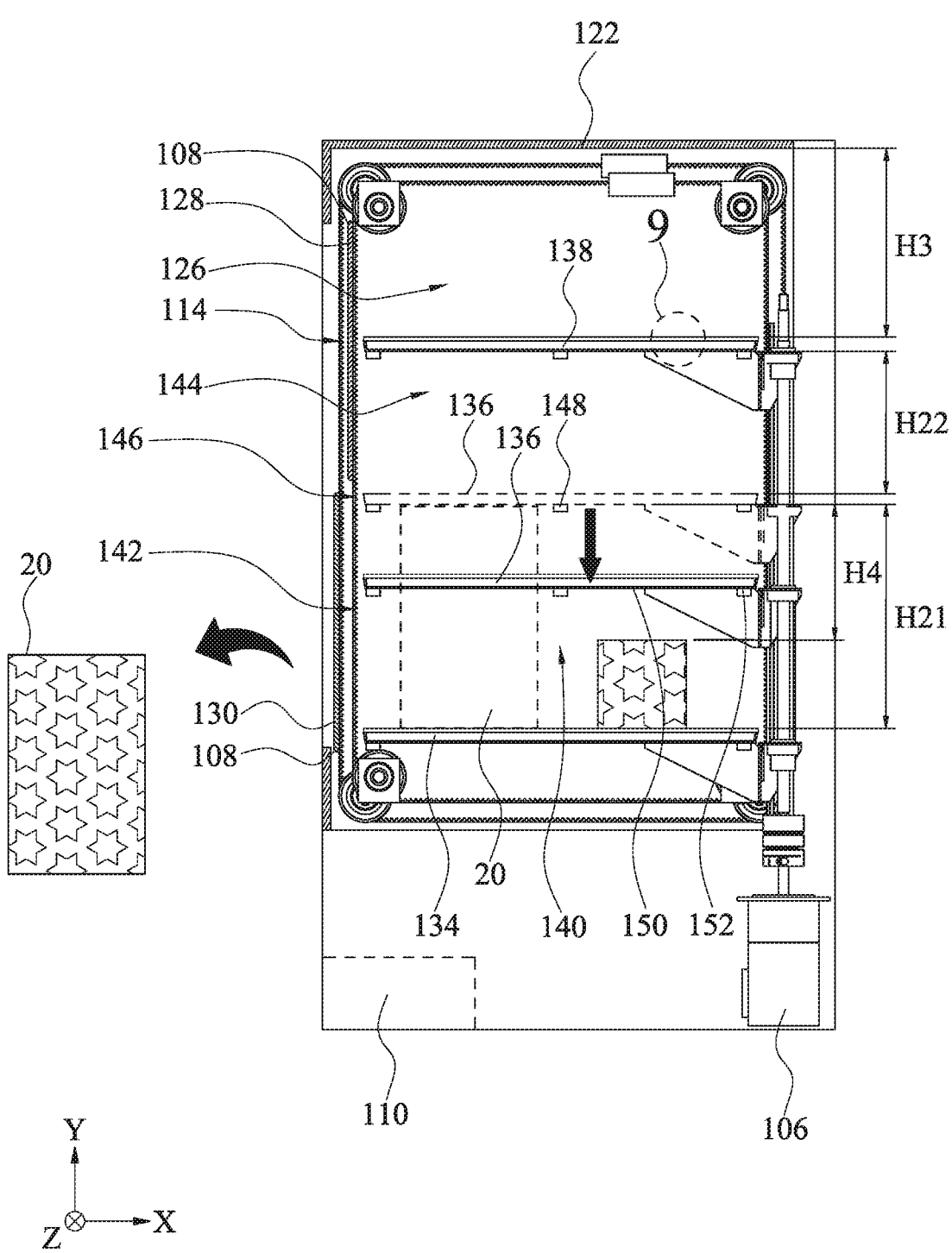
FIG. 8 is a sectional view of a storage cabin in an A-A direction according to some embodiments of the present application, which schematically shows that an action of retrieving an item from a first storage space.

Refer to FIG. 3 and FIG. 8 together. FIG. 8 is a sectional view of a storage cabin in an A-A direction according to some embodiments of the present application, which schematically shows that an action of retrieving an item from a first storage space. In some embodiments, the storage device 10 further includes a visual assembly 148. The visual assembly 148 is connected to a fixed surface 150 of each of the second carrier plate 136 and the third carrier plate 138. The visual assembly 148 is configured to obtain a remaining storage height H4. The controller set 110 updates a height H21 of the first storage space 140, a height H22 of the second storage space 144, and the height H3 of the remaining space 126 according to the remaining storage height H4. The visual assembly 148 may be, for example, a three-dimensional camera or a time of flight camera. The visual assembly 148 may be disposed in the center of the fixed surface 150, such that the visual assembly 148 may obtain a wide visual range. In addition, the visual assembly 148 may continuously or periodically sense the remaining storage height H4. The controller set 110 may drive, according to the remaining storage height H4, the transmission assembly 106 to adjust the position of each carrier plate 116 (for example, the first carrier plate 134, the second carrier plate 136, or the third carrier plate 138), thereby improving space utilization efficiency. For example, after the item 20 is retrieved from the first storage space 140, the visual assembly 148 disposed on the second carrier plate 136 may obtain a current remaining storage height H4. After the controller set 110 compares previous and current remaining storage heights H4 (for example, subtract the current remaining storage height H4 from the previous remaining storage height H4), the controller set 110 may determine that the remaining storage height H4 has changed, update a height, stored last time, of the first access opening 142 (that is, the height H21 of the first storage space 140) with the current remaining storage height H4, and drive the transmission assembly 106, such that the second carrier plate 136 moves to a coordinate position corresponding to the current remaining storage height H4. Alternatively, the controller set 110 may update coordinate positions corresponding to the first access opening 142, the second access opening 146, and the remaining storage height H4. In some embodiments, when the remaining storage height H4 changes, the controller set 110 may drive the door assembly 108, such that the door assembly 108 performs the door closing motion. Accordingly, when the item 20 has been retrieved from the storage cabin 102, the controller set 110 may immediately drive the door assembly 108 to cover the opening portion 114. In some embodiments, the visual assembly 148 may continuously sense the remaining storage height H4, and the controller set 110 may continuously obtain the remaining storage height H4. Alternatively, the controller set 110 drives the visual assembly 148 to sense the remaining storage height H4 after the transmission assembly 106 completes the door closing motion, so that the controller set 110 obtains the remaining storage height H4 only after the door closing motion.

Refer to FIG. 3 and FIG. 8 again. In some embodiments, the storage device 10 further includes a sensor set 152. The sensor set 152 is connected to a fixed surface 150 of the second carrier plate 136. The sensor set 152 is actuated to generate a sensing signal. The controller set 110 updates a height H21 of the first storage space 140, a height H22 of the second storage space 144, and the height H3 of the remaining space 126 according to the sensing signal. The sensor set 152 may be, for example, an ultrasonic sensor, an infrared sensor, or a grating (for example, a grating including an infrared emitter). The sensor set 152 may be disposed around the fixed surface 150, such that the sensor set 152 forms a sensing range on the fixed surface 150. When the item 20 is retrieved from the storage cabin 102, and the transmission assembly 106 completes the door closing motion, the controller set 110 may drive the transmission assembly 106, such that the second carrier plate 136 moves towards the first carrier plate 134. During movement of the second carrier plate 136, when the sensor set 152 senses the item 20 and is actuated (when the item 20 is in contact with the sensing range of the sensor set 152), the sensor set 152 generates the sensing signal. The controller set 110 may update the height H21, the height H22, and the height H3 according to the sensing signal. The updating the height (H21, H22, and H3) may mean that the controller set 110 obtains a height reduction value according to a movement distance of the second carrier plate 136 when the sensor set 152 is actuated. Then, the controller set 110 calculates a new height H21, a new height H22, and a new height H3 according to the height reduction value. For example, the height reduction value is subtracted from an original height H21 to obtain the new height H21, and then the new height H22 and the new height H3 are calculated based on the new height H21. It is to be noted that in the foregoing example, only the height H21 of the first storage space 140 changes, the height H22 of the second storage space 144 remains an original height, and the height H3 of the remaining space 126 changes with the height H21 of the first storage space 140. Therefore, an original height H3 of the remaining space 126 plus the height reduction value is the new height H3 of the remaining space 126.

As shown in FIG. 3 and FIG. 8, in some embodiments, the storage device 10 further includes an operation assembly 154. The operation assembly 154 is configured to obtain an item height H1 (see FIG. 4A and FIG. 4B) and an identification code. The identification code corresponds to the first access opening 142 and the second access opening 146. The controller set 110 is configured to drive, according to the item height H1 and the identification code, the door assembly 108 to selectively cover the portion of the opening portion 114 other than the first access opening 142 or the second access opening 146. The operation assembly 154 may be fixed to the storage cabin 102, and may be coupled to the controller set 110 through a connecting wire. Alternatively, the operation assembly 154 may be separated from the storage cabin 102, and may be connected to the controller set 110 through a connecting wire or in a wireless manner (for example, through Bluetooth). In addition, the operation assembly 154 may be, for example, a mobile communication apparatus, a computer device, or a human-computer interface apparatus with a calculation function. The user may transmit the item height H1 to the controller set 110 through the operation assembly 154. In some embodiments, the operation assembly 154 further includes a sensor 156. The sensor 156 is configured to obtain the item height H1 when actuated. The sensor 156 may be actuated by the operation assembly 154. Alternatively, the sensor 156 is actuated when the item 20 enters a sensing range of the sensor 156. In some embodiments, when the user is intended to retrieve the item 20 stored in the first storage space 140, the user may enter, through the operation assembly 154, the identification code corresponding to the first access opening 142. The operation assembly 154 may transmit the identification code to the controller set 110. The controller set 110 may drive, according to the identification code, the door assembly 108 to perform the door opening motion, to expose the first access opening 142. In some embodiments, the user may directly operate the controller set 110 after retrieving the item 20, such that the controller set 110 drives the door assembly 108 to perform the door closing motion.

Figure 9:
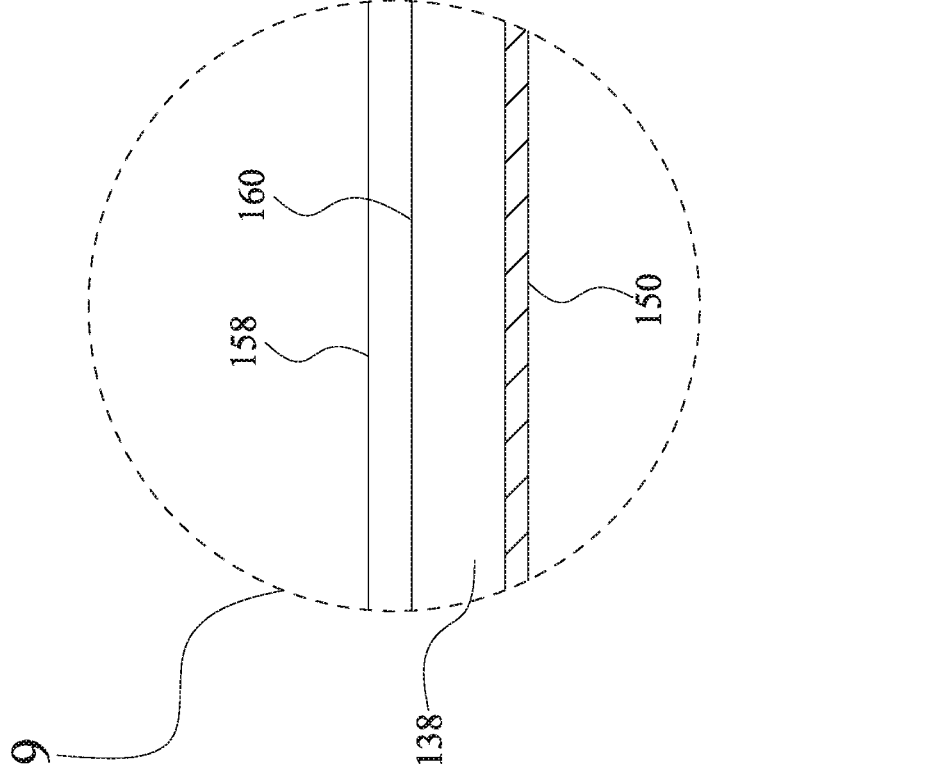
FIG. 9 is an enlarged view of a region 9 in FIG. 8.

Refer to FIG. 3, FIG. 8, and FIG. 9 together. FIG. 9 is an enlarged view of a region 9 in FIG. 8; and in some embodiments, the storage device 10 further includes a weight measurer 158. The weight measurer 158 is connected to a carrying surface 160 of each of the first carrier plate 134, the second carrier plate 136, and the third carrier plate 138. The weight measurer 158 is actuated to obtain an item weight. The controller set 110 selectively drives, according to the item weight, the door assembly 108 to cover the opening portion 114. The weight measurer 158 may be, for example, a weigher. The weight measurer 158 may continuously obtain the item weight after the item 20 is in direct or indirect contact with the weight measurer 158. Alternatively, the controller set 110 actuates the weight measurer 158 to obtain an item weight when the door assembly 108 completes a door closing motion. The foregoing direct contact may mean that the weight measurer 158 is connected to the carrying surface 160, and the item 20 is directly placed on the weight measurer 158. The indirect contact may mean that a gasket (not shown in the figure) is laid on the carrying surface 160, and the weight measurer 158 is located between the gasket and the carrying surface 160. When the weight measurer 158 measures the weight, a weight of the gasket is or is not subtracted. It is to be noted that: that "the controller set 110 selectively drives, according to the item weight, the door assembly 108 to cover the opening portion 114" may mean that when the item weight changes, indicating that the item 20 has been retrieved or stored, the controller set 110 may drive the door assembly 108 to perform the door closing motion, to cover the opening portion 114. In some embodiments, an area of the weight measurer 158 may be substantially equal to that of the carrying surface 160, such that when the item 20 is placed on the carrying surface 160, the weight measurer 158 disposed on the carrying surface 160 may measure the item weight.

As shown in FIG. 2 and FIG. 3, in some embodiments, the storage device 10 includes a counter 162. The counter 162 is configured to generate a counting stopping signal. The controller set 110 drives, according to the counting stopping signal, the door assembly 108 to cover the opening portion 114. The counter 162 may be, for example, a counting relay or a counting circuit. The counting circuit may be disposed in an integrated circuit in the controller set 110, or may be coupled to a circuit board. The counter 162 may be actuated to generate a counting starting signal and the counting stopping signal. Specifically, when the controller set 110 drives the door assembly 108, the controller set 110 actuates the counter 162, such that the counter 162 generates the counting starting signal. The counter 162 may start counting according to the counting starting signal (counting time may be set as required), and generate and send the counting stopping signal after completing counting. Alternatively, after the door assembly 108 completes the door opening motion, the controller set 110 actuates the counter 162, such that the counter 162 generates the counting starting signal. The counter 162 may start counting according to the counting starting signal, and generate and send the counting stopping signal after completing counting. In this embodiment, the controller set 110 may automatically close the door assembly 108 after the door assembly 108 is open for a preset period of time (that is, time from the counting starting signal to the counting stopping signal), thereby ensuring safety of the storage cabin 102.

Figure 10:
FIG. 10 is a three-dimensional diagram of a storage device according to some embodiments of the present application, which shows that a storage cabin is connected to a moving carrier.

Refer to FIG. 3 and FIG. 10 together. FIG. 10 is a three-dimensional diagram of a storage device according to some embodiments of the present application, which shows that a storage cabin is connected to a moving carrier. The storage device 10 further includes the moving carrier 164. The moving carrier 164 includes a moving assembly 166, a communication assembly 168, and a processor 170. The moving assembly 166 is connected to the storage cabin 102, and is configured to move the storage cabin 102. The communication assembly 168 is configured to receive an access signal. The processor 170 is coupled to the moving assembly 166 and the communication assembly 168, and is configured to drive the moving assembly 166 according to the access signal, such that the moving assembly 166 moves to an access position. In this embodiment, the storage device 10 moves to the access position through the moving carrier 164. The moving assembly 166 may be, for example, an electric carrier or a track set. The communication assembly 168 may use, for example, Bluetooth, wireless fidelity (Wi-Fi), mobile network (for example, 5th-generation mobile communication technology), or Zigbee communication. The processor 170 may be, for example, a CPU, a single-chip microcomputer, an FPGA, a GPU, an MCU, or a microprogram controller. In some embodiments, the user may send the access signal to the moving carrier 164 through a mobile communication apparatus. The access position may be a coordinate position. The access signal may include moving path information or moving coordinate information, such that the processor 170 may drive, according to the moving path information or the moving coordinate information, the moving assembly 166 to move to the access position according to a specified path or coordinate.

In summary, in some embodiments, the storage device 10 includes the storage cabin 102, the carrier assembly 104, the transmission assembly 106, the door assembly 108, and the controller set 110. When the item 20 is stored in the storage cabin 102, the controller set 110 may drive, according to the item height H1 of the item 20, the transmission assembly 106 to selectively move the carrier plates 116, such that the carrier plates 116 respectively divide the receiving portion 112 and the opening portion 114 to form the storage space 118 and the access opening 120 that correspond to the item height H1. In addition, the controller set 110 may drive, according to the item height H1, the door assembly 108 to cover the portion of the opening portion 114 other than the access opening 120. Moreover, the storage space 118 is adjusted according to the item height H1, the height H2 of the storage space 118, and the height H3 of the remaining space 126, such that the controller set 110 may first adjust the storage space 118 to satisfy the item height H1 before the item 20 is stored in the storage cabin 102. When the door assembly 108 is opened, the door assembly 108 exposes only the access opening 120 of the storage space 118, thereby preventing the user from mistakenly store the item 20 in another storage space 118. Furthermore, when the user is intended to retrieve the item 20, the controller set 110 may drive, according to the identification code corresponding to the specific access opening 120, the door assembly 108 to expose only the specific access opening 120, thereby preventing the user from retrieving an item 20 in another storage space 118.

Although the present application has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A storage device, comprising:
   a storage cabin, having a receiving portion and an opening portion, the storage cabin comprising a top plate and a bottom plate, the receiving portion and the opening portion are located between the top plate and the bottom plate;
   a carrier assembly, located in the receiving portion and comprising a plurality of carrier plates, the plurality of carrier plates comprising a first carrier plate, a second carrier plate, and a third carrier plate, the first carrier plate is adjacent to the bottom plate, the third carrier plate is adjacent to the top plate, and the second carrier plate is located between the first carrier plate and the third carrier plate;

a transmission assembly, connected to the carrier assembly and selectively moving the carrier plates;

a door assembly, comprising a first door panel, a second door panel, and an actuator, wherein the first door panel and the second door panel are adjacent to the opening portion, an the actuator is configured to actuate the first door panel and the second door panel; and a controller set, configured to drive the transmission assembly to make the first carrier plate and the second carrier plate divide the receiving portion and the opening portion into a first storage space and a first access opening respectively according to an item height, and drive the actuator to make the first door plate and the second door plate cover a portion of the opening portion other than the first access opening, wherein a height of the first storage space corresponds to the item height;

wherein the receiving portion defines a remaining space according to the first storage space, and in response to another item height is larger than a height of the remaining space, the controller set is configured not to drive the transmission assembly to form a second storage space through division by the second carrier plate and the third carrier plate.

2. The storage device according to claim 1, wherein the second storage space and a second access opening are formed through division by the second carrier plate and the third carrier plate.

3. The storage device according to claim 2, further comprising a visual assembly, wherein the visual assembly is connected to a fixed surface of each of the second carrier plate and the third carrier plate, the visual assembly is configured to obtain a remaining storage height, and the controller set updates a height of the first storage space, a height of the second storage space, and the height of the remaining space according to the remaining storage height.

4. The storage device according to claim 2, further comprising a sensor set, wherein the sensor set is connected to a fixed surface of each of the second carrier plate and the third carrier plate, the sensor set is actuated to generate a sensing signal, and the controller set updates a height of the first storage space, a height of the second storage space, and the height of the remaining space according to the sensing signal.

5. The storage device according to claim 2, further comprising an operation assembly, wherein the operation assembly is configured to obtain the item height and an identification code, the identification code corresponds to the first access opening and the second access opening, and the controller set is configured to drive, according to the item height and the identification code, the door assembly to selectively cover a portion of the opening portion other than the first access opening or the second access opening.

6. The storage device according to claim 2, further comprising a weight measurer, wherein the weight measurer is connected to a carrying surface of each of the first carrier plate, the second carrier plate, and the third carrier plate, the weight measurer is actuated to obtain an item weight, and the controller set selectively drives, according to the item weight, the door assembly to cover the opening portion.

7. The storage device according to claim 1, further comprising a counter, wherein the counter is coupled to the controller set, and is configured to generate a counting stopping signal, and the controller set drives, according to the counting stopping signal, the door assembly to cover the opening portion.

8. The storage device according to claim 1, further comprising:

a moving carrier, comprising:

a moving assembly, connected to the storage cabin and configured to move the storage cabin;

a communication assembly, configured to receive an access signal; and a processor, coupled to the moving assembly and the communication assembly, wherein the processor is configured to drive the moving assembly according to the access signal, such that the moving assembly moves to an access position.

9. A storage device, comprising:

a storage cabin, having a receiving portion and an opening portion, the storage cabin comprising a top plate and a bottom plate, the receiving portion and the opening portion are located between the top plate and the bottom plate;

a carrier assembly, located in the receiving portion and comprising a plurality of carrier plates, the plurality of carrier plates comprising a first carrier plate, a second carrier plate, and a third carrier plate, the first carrier plate is adjacent to the bottom plate, the third carrier plate is adjacent to the top plate, and the second carrier plate is located between the first carrier plate and the third carrier plate;

a transmission assembly, connected to the carrier assembly and selectively moving the carrier plates;

a door assembly, comprising a first door panel, a second door panel, and an actuator, wherein the first door panel and the second door panel are adjacent to the opening portion, and the actuator is configured to actuate the first door panel and the second door panel; and a controller set, configured to drive the transmission assembly to make the first carrier plate and the second carrier plate divide the receiving portion and the opening portion into a first storage space and a first access opening respectively according to an item height, and drive the door assembly to make the first door plate and the second door plate cover a portion of the opening portion other than the first access opening, wherein a height of the first storage space corresponds to the item height; and wherein the storage space is subtracted from the receiving portion to obtain a remaining space, and in response to another item height is larger than a height of the remaining space, the controller set is configured not to drive the transmission assembly to form a second storage space through division by the second carrier plate and the third carrier plate;

wherein the access opening has an identification code, and the controller set drives, according to the identification code, the door assembly to cover the portion of the opening portion other than the first access opening corresponding to the identification code.

10. The storage device according to claim 9, wherein the second storage space and a second access opening are formed through division by the second carrier plate and the third carrier plate.

11. The storage device according to claim 10, further comprising an operation assembly, wherein the operation assembly is configured to obtain the item height and an identification code, the identification code corresponds to the first access opening and the second access opening, and the controller set is configured to drive, according to the item height and the identification code, the door assembly to 5 selectively cover a portion of the opening portion other than the first access opening or the second access opening.

12. The storage device according to claim 10, further comprising a visual assembly, wherein the visual assembly is connected to a fixed surface of each of the second carrier 10 plate and the third carrier plate, the visual assembly is configured to obtain a remaining storage height, and the controller set updates a height of the first storage space, a height of the second storage space, and the height of the remaining space according to the remaining storage height. 15

13. The storage device according to claim 10, further comprising a sensor set, wherein the sensor set is connected to a fixed surface of each of the second carrier plate and the third carrier plate, the sensor set is actuated to generate a sensing signal, and the controller set updates a height of the 20 first storage space, a height of the second storage space, and the height of the remaining space according to the sensing signal.

14. The storage device according to claim 10, further comprising a weight measurer, wherein the weight measurer 25 is connected to a carrying surface of each of the first carrier plate, the second carrier plate, and the third carrier plate, the weight measurer is actuated to obtain an item weight, and the controller set selectively drives, according to the item weight, the door assembly to cover the opening portion. 30

\* \* \* \* \*